United States Patent
Zhang

(10) Patent No.: US 10,666,139 B1
(45) Date of Patent: May 26, 2020

(54) SWITCHING REGULATOR WITH PROPORTIONAL-INTEGRAL (PI) CONTROL COMPENSATION NETWORK CLAMP

(71) Applicant: Analog Devices International Unlimited Company, Limerick (IE)

(72) Inventor: Bin Zhang, Grass Valley, CA (US)

(73) Assignee: Analog Devices International Unlimited Company, Limerick (IE)

( * ) Notice: Subject to any disclaimer, the term of this patent is extended or adjusted under 35 U.S.C. 154(b) by 0 days.

(21) Appl. No.: 16/287,887

(22) Filed: Feb. 27, 2019

(51) Int. Cl.
*H02M 3/156* (2006.01)
*H02M 1/00* (2006.01)

(52) U.S. Cl.
CPC .... *H02M 3/156* (2013.01); *H02M 2001/0025* (2013.01)

(58) Field of Classification Search
CPC ........... H02M 2003/1566; H02M 1/32; H02M 2001/0025; H02M 3/156; H02H 3/20; H02H 3/202
USPC .................................. 323/174, 299, 282, 384
See application file for complete search history.

(56) References Cited

U.S. PATENT DOCUMENTS

| | | | |
|---|---|---|---|
| 6,064,187 A | 5/2000 | Redl et al. | |
| 6,369,557 B1 | 4/2002 | Agiman | |
| 6,611,131 B2 | 8/2003 | Edwards | |
| 6,806,689 B2 | 10/2004 | Schuellein et al. | |
| 6,828,766 B2 | 12/2004 | Corva et al. | |
| 7,030,596 B1 | 4/2006 | Salerno et al. | |
| 7,176,668 B2 | 2/2007 | Oswald et al. | |
| 7,518,348 B1 | 4/2009 | Kobayashi | |
| 8,018,694 B1 | 9/2011 | Wu | |
| 8,169,207 B2 | 5/2012 | Omi | |
| 9,041,371 B2* | 5/2015 | Gotoh | H02M 3/156 323/282 |
| 9,577,517 B2 | 2/2017 | Thiele et al. | |
| 9,641,073 B2 | 5/2017 | Mahmoudi et al. | |
| 9,667,145 B1 | 5/2017 | Goenawan et al. | |

(Continued)

FOREIGN PATENT DOCUMENTS

| | | |
|---|---|---|
| CN | 107453588 A | 12/2017 |
| CN | 107659148 A | 2/2018 |
| EP | 2747262 A1 | 6/2014 |

OTHER PUBLICATIONS

"LT3757: Boost, Flyback, SEPIC and Inverting Controller", Linear Technology Datasheet, (2018), 38 pgs.

(Continued)

*Primary Examiner* — Kyle J Moody
*Assistant Examiner* — Peter M Novak
(74) *Attorney, Agent, or Firm* — Schwegman Lundberg & Woessner, P.A.

(57) ABSTRACT

During a load transient or load current step, an error amplifier of a regulator circuit can be temporarily pushed to saturation and a compensation capacitor can be discharged. The present inventor has recognized, among other things, that the transient response performance in such a case can suffer due to the slow rising rate of the error amplifier caused by the slow charging of the compensation capacitor. Using various techniques, a switching regulator circuit can include a proportional-integral (PI) compensation network clamp circuit that can provide a fast system transient response and a low quiescent current, which can reduce power consumption.

20 Claims, 12 Drawing Sheets

(56) References Cited

U.S. PATENT DOCUMENTS

| | | |
|---|---|---|
| 2005/0184717 A1 | 8/2005 | Walters |
| 2008/0030178 A1 | 2/2008 | Leonard et al. |
| 2009/0278521 A1 | 11/2009 | Omi et al. |
| 2011/0018507 A1 | 1/2011 | Mccloy-Stevens et al. |
| 2011/0115456 A1* | 5/2011 | Tanifuji ................ H02M 3/156 323/283 |
| 2011/0193539 A1 | 8/2011 | Schmidt et al. |
| 2016/0233768 A1* | 8/2016 | de Cremoux ......... H02M 3/157 |
| 2017/0358984 A1 | 12/2017 | Unno |
| 2018/0054129 A1 | 2/2018 | Halberstadt et al. |
| 2018/0375438 A1* | 12/2018 | Shekhar ............ H02M 3/33569 |

OTHER PUBLICATIONS

"LT3758: High Input Voltage, Boost, Flyback, SEPIC and Inverting Controller", Linear Technology Datasheet, (2019), 38 pgs.

Sheehan, Robert, et al., "Switch-mode power converter compensation made easy", Texas Instruments Power Supply Design Seminar, (2016), 38 pgs.

* cited by examiner

US 10,666,139 B1

SWITCHING REGULATOR WITH PROPORTIONAL-INTEGRAL (PI) CONTROL COMPENSATION NETWORK CLAMP

FIELD OF THE DISCLOSURE

This document pertains generally, but not by way of limitation, to switch mode power converters.

BACKGROUND

Voltage regulators provide a predetermined and substantially constant output voltage, even while using an input voltage source that may be poorly specified. Many electronic products use voltage regulators to convert an input voltage into a regulated output voltage that may be higher or lower than the input voltage. Accordingly, voltage regulators may function as both a voltage converter and a voltage stabilizer.

There are two major categories of regulators, namely linear regulators and switching regulators. For example, in linear regulators, the output voltage may be regulated by adjusting a passive element (e.g., a variable resistor) to control a continuous flow of current from the voltage source to the load.

On the other hand, switching regulators, are essentially DC-DC converters that operate by switching current ON and OFF to control the output voltage. Switching regulators can use one or more switching devices, along with an inductor and a capacitor in order to store and transfer energy to a load. Such regulators control the voltage supplied to the load by turning the switching element(s) ON and OFF, thereby regulating the amount of power being transmitted through the inductor in the form of discrete current pulses. For example, the inductor and the capacitor convert the supplied current pulses into a substantially constant load current such that the load voltage is regulated. Accordingly, regulation of the output voltage may be achieved through the ON-OFF duty cycle adjustment of the switching element(s), based on feedback signals indicative of the output voltage and load current.

SUMMARY OF THE DISCLOSURE

During a load transient or load current step, an error amplifier of a regulator circuit can be temporarily pushed to saturation and a compensation capacitor can be discharged. The present inventor has recognized, among other things, that the transient response performance in such a case can suffer due to the slow rising rate of the error amplifier caused by the slow charging of the compensation capacitor. Using various techniques of this disclosure, a switching regulator circuit can include a proportional-integral (PI) compensation network clamp circuit that can provide a fast system transient response and a low quiescent current, which can reduce power consumption.

In some aspects, this disclosure is directed to a switching regulator circuit to supply a current at a regulated voltage to an output node coupled to a load, the switching regulator circuit comprising: a power stage circuit configured to supply the current to the output node, the power stage circuit including an inductor and a switch circuit and coupled between an input node and the output node, an error amplifier circuit configured to receive a representation of an output node voltage and generate a current control signal to maintain the output node at the regulated voltage by controlling an inductor current; a compensation network coupled to an output node of the error amplifier circuit, the compensation network including at least one resistor and at least one capacitor, the at least one resistor coupled between the output node of the error amplifier circuit and a control node, the at least one capacitor coupled between the control node and ground; a clamp circuit coupled to the control node; and a control circuit configured to receive the current control signal and control the inductor current using the current control signal.

In some aspects, this disclosure is directed to a method of operating a switching regulator circuit to supply a current at a regulated voltage to an output node coupled to a load, the method comprising: supplying the current to the output node, the power stage circuit including an inductor and a switch circuit and coupled between an input node and the output node; receiving a representation of an output node voltage and generating a current control signal to maintain the output node at the regulated voltage by controlling an inductor current; clamping a control node in a compensation network to a reference voltage, the compensation network including at least one resistor and at least one capacitor, the at least one resistor coupled between the output node of the error amplifier circuit and the control node, the at least one capacitor coupled between the control node and ground; and controlling the inductor current using the current control signal.

In some aspects, this disclosure is directed to a switching regulator circuit to supply a current at a regulated voltage to an output node coupled to a load, the switching regulator circuit comprising: a power stage circuit configured to supply the current to the output node, the power stage circuit including an inductor and a switch circuit and coupled between an input node and the output node; an error amplifier circuit configured to receive a representation of an output node voltage and generate a current control signal to maintain the output node at the regulated voltage by controlling an inductor current; means for clamping a control node in a compensation network to a reference voltage, the compensation network including at least one resistor and at least one capacitor, the at least one resistor coupled between the output node of the error amplifier circuit and the control node, the at least one capacitor coupled between the control node and ground; and means for controlling the inductor current using the current control signal.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Proportional-integral (PI) control is a type of feedback system control. In switching regulator circuits, a PI compensation network can generate a control voltage that can be used to control an inductor current in the switching regulator. The PI compensation network can stabilize and optimize the closed loop control of the power supply. This disclosure describes techniques for using a PI controller compensation network clamp circuit in a voltage closed loop control for switching regulator circuits.

The voltage closed loop control can include a combination of an error amplifier (EAMP) and a PI compensation network. The EAMP output current corresponds to a difference between the actual output voltage and the desired output voltage. The EAMP output current can flow through the PI compensation network to generate a control voltage that can be used to control an inductor current in the switching regulator. In this way, the output voltage can be regulated by controlling the inductor current.

During a load transient or load current step, the EAMP can be temporarily pushed to saturation and the compensation capacitor can be discharged. The present inventor has recognized, among other things, that the transient response performance in such a case can suffer due to the slow rising rate of the EAMP caused by the slow charging of the compensation capacitor. Using various techniques of this disclosure, a switching regulator circuit can include a PI compensation network clamp circuit that can help provide a solution to the above-identified problem by providing a fast system transient response and a low quiescent current, which can reduce power consumption.

Figure 1:
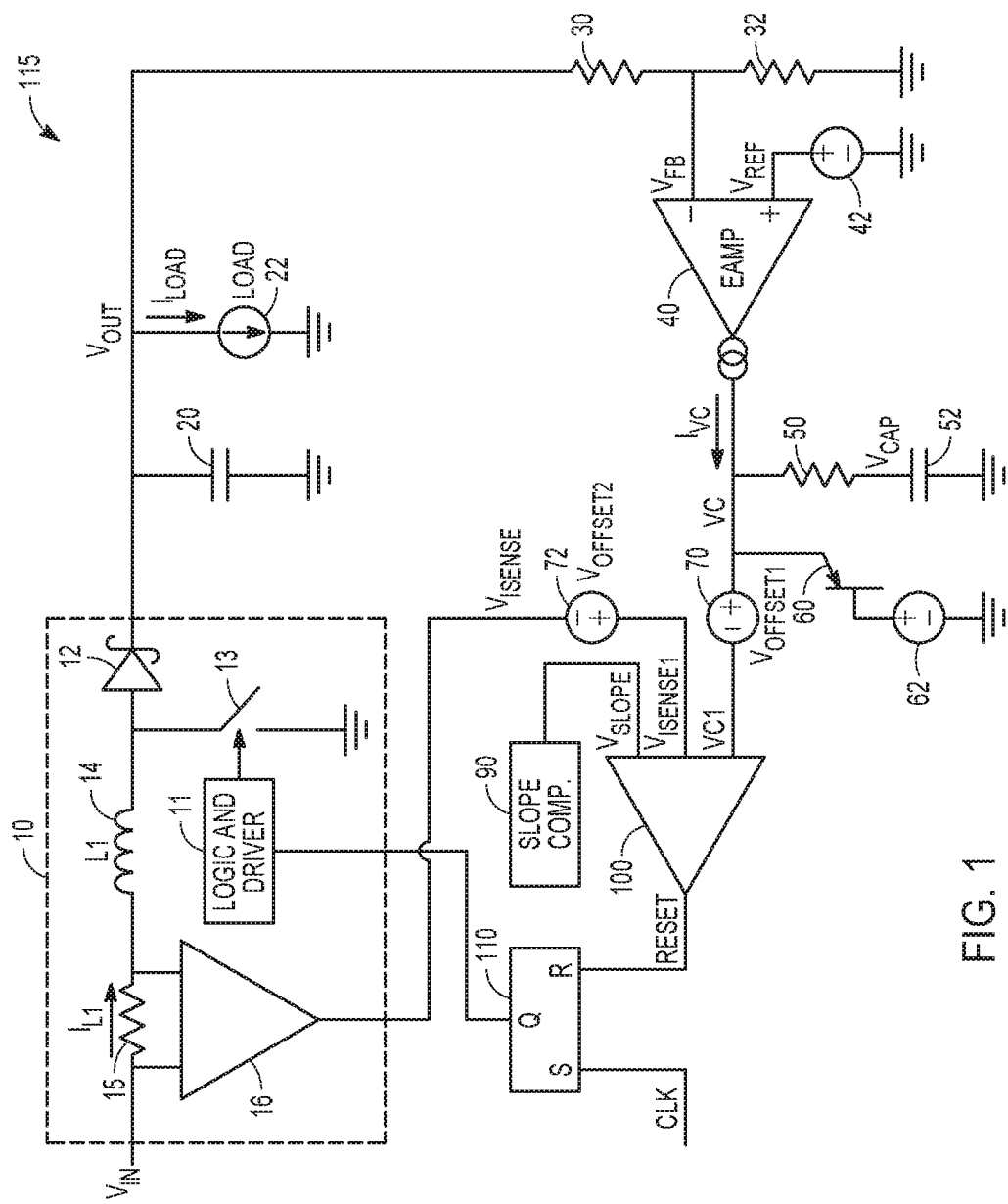
FIG. 1 is a schematic diagram of an example of a DC/DC switching regulator circuit.

FIG. 1 is a schematic diagram of an example of a DC/DC switching regulator circuit. The switching regulator circuit 115 can include a power stage 10, e.g., a boost switch mode power supply, coupled between an input node $V_{IN}$ and an output node $V_{OUT}$. The power stage 10 can include a logic and drive circuit 11 to control a switch circuit including one or more switches, such as a switch 13, e.g., a transistor. The power stage can further include a current sense element 15. An inductor current $I_{L1}$ through an inductor 14 can be measured based on the voltage drop across the current sense element 15, which is received and amplified using voltage amplifier 16.

The voltage amplifier 16 can generate an output voltage $V_{ISENSE}$ that represents the inductor current. The output voltage $V_{ISENSE}$ can be applied to a comparator circuit 100, as described below, which can be used to generate a signal to control the inductor current. In this manner, a first feedback circuit can be formed at least by the voltage amplifier 16 and the comparator 100 to monitor the inductor current and generate a feedback signal $V_{ISENSE}$.

When the logic and drive circuit 11 controls the switch 13 to close, the inductor current $I_{L1}$ can increase through inductor 14 and the switch 13. When the logic and drive circuit 11 controls the switch 13 to open, the input voltage $V_{IN}$ causes the inductor current $I_{L1}$ to flow through the diode 12 and to a load coupled to an output node $V_{OUT}$, which charges up capacitor 20. The load 22 is represented as a constant current source.

The switching regulator 115 can include an error amplifier (EAMP) circuit 40 configured to receive a representation of the output voltage $V_{OUT}$, such as determined by a voltage divider formed by resistors 30, 32, for example. The representation of the output voltage $V_{OUT}$ is shown in FIG. 1 as a feedback voltage $V_{FB}$. In this manner, a second feedback circuit can be formed at least by the resistors 30, 32 to monitor the output voltage and generate a feedback signal $V_{FB}$.

The EAMP 40 can be configured to receive and be responsive to the feedback signal $V_{FB}$ and generate an output current $I_{VC}$ and a control voltage VC (also referred to in this disclosure as a current control signal or current control signal voltage). The output current $I_{VC}$ of the EAMP 40 corresponds to a difference between the actual output voltage $V_{OUT}$ and the desired regulated output voltage, $V_{OUT\_REG}$, which can be set by the reference voltage $V_{REF}$ applied to the EAMP 40. The output current $I_{VC}$ can be used to maintain the output node $V_{OUT}$ at the regulated voltage by controlling the inductor current.

The current $I_{VC}$ flows through a proportional-integral (PI) compensation network, which can include a resistor 50 for proportional compensation and a capacitor 52 for integral compensation, to generate a control voltage VC. The compensation network can stabilize and optimize the closed loop control of the switching regulator.

The control voltage VC (or current control signal) can be applied to a control circuit that includes at least the comparator circuit 100 and a slope comparator circuit 90. The control circuit can control the inductor current, e.g., the peak inductor current, using at least the current control signal or control voltage VC.

In some example configurations, an offset voltage $V_{OFFSET1}$ 70 can be added to the control voltage VC, resulting in voltage VC1, which can then be applied to the comparator circuit 100. The offset voltage $V_{OFFSET1}$ 70 can help ensure that an operational voltage of the error amplifier 40 is within its linear region and avoid saturation.

The voltage $V_{ISENSE}$ represents an inductor current sense signal. In some example configurations, an offset voltage $V_{OFFSET2}$ 72 can be added to the voltage $V_{ISENSE}$, resulting in voltage $V_{ISENSE1}$, which can then be applied to the comparator circuit 100. The comparator circuit 100 can compare the voltage VC1 to the sum of the inductor current sense signal $V_{ISENSE1}$ and a slope compensation signal $V_{SLOPE}$ from the slope compensation circuit 90. In this manner, the peak of the sum of voltages $V_{ISENSE1}$ and $V_{SLOPE}$ can be regulated to the control voltage VC1 and, as a result, the peak inductor current $I_{L1}$ can be controlled by the control voltage VC to generate a desired output voltage $V_{OUT}$.

The offset voltage $V_{OFFSET2}$ can help ensure that the control voltage VC1 can be lower than the voltage $V_{ISENSE1}$, even for a voltage $V_{ISENSE}$ as low as 0 volts (V). This can allow the RESET output of the comparator 100 to be high when the load current $I_{LOAD}$ is very small, or even zero, to keep the Q output of a flip-flop circuit 110, e.g., an S-R latch, low when a clock signal CLK is applied. In these conditions, the logic and drive circuit 11, which is coupled to the Q output of the flip-flop circuit 110, can control the switch 13 to remain OFF, even when the clock signal CLK is applied, to prevent too much current being delivered to the output node so that a desired output voltage $V_{OUT}$ is maintained.

The switching regulator 115 can further include a control voltage VC voltage limit circuit that can include a device 60. In some example implementations, the control voltage VC voltage limit circuit can include a voltage source 62 to limit the control voltage VC voltage to a maximum control voltage $VC_{MAX}$ to limit the peak inductor current $I_{L1\_PEAK}$. The device 60 can be a transistor, such as a bipolar junction transistor (BJT) e.g., a PNP BJT, or a field-effect transistor (FET), e.g., a p-type FET.

Figure 2:
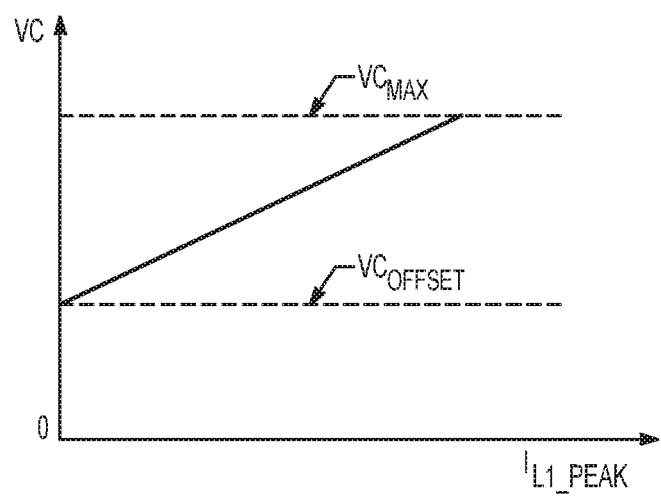
FIG. 2 is a graph depicting a relationship between a control voltage and a peak inductor current of the power supply of FIG. 1.

FIG. 2 is a graph depicting a relationship between a control voltage and a peak inductor current of the power supply of FIG. 1. The x-axis represents the peak inductor current $I_{L1\_PEAK}$ and the y-axis represents the control voltage VC. As seen in FIG. 2, the offset voltage $VC_{OFFSET}$ voltage is equal to the VC value where the peak inductor current reaches zero and the maximum control voltage $VC_{MAX}$ can provide the upper limit of the control voltage VC. Limiting the control voltage VC can limit the peak inductor current $I_{L1\_PEAK}$.

Figure 3:
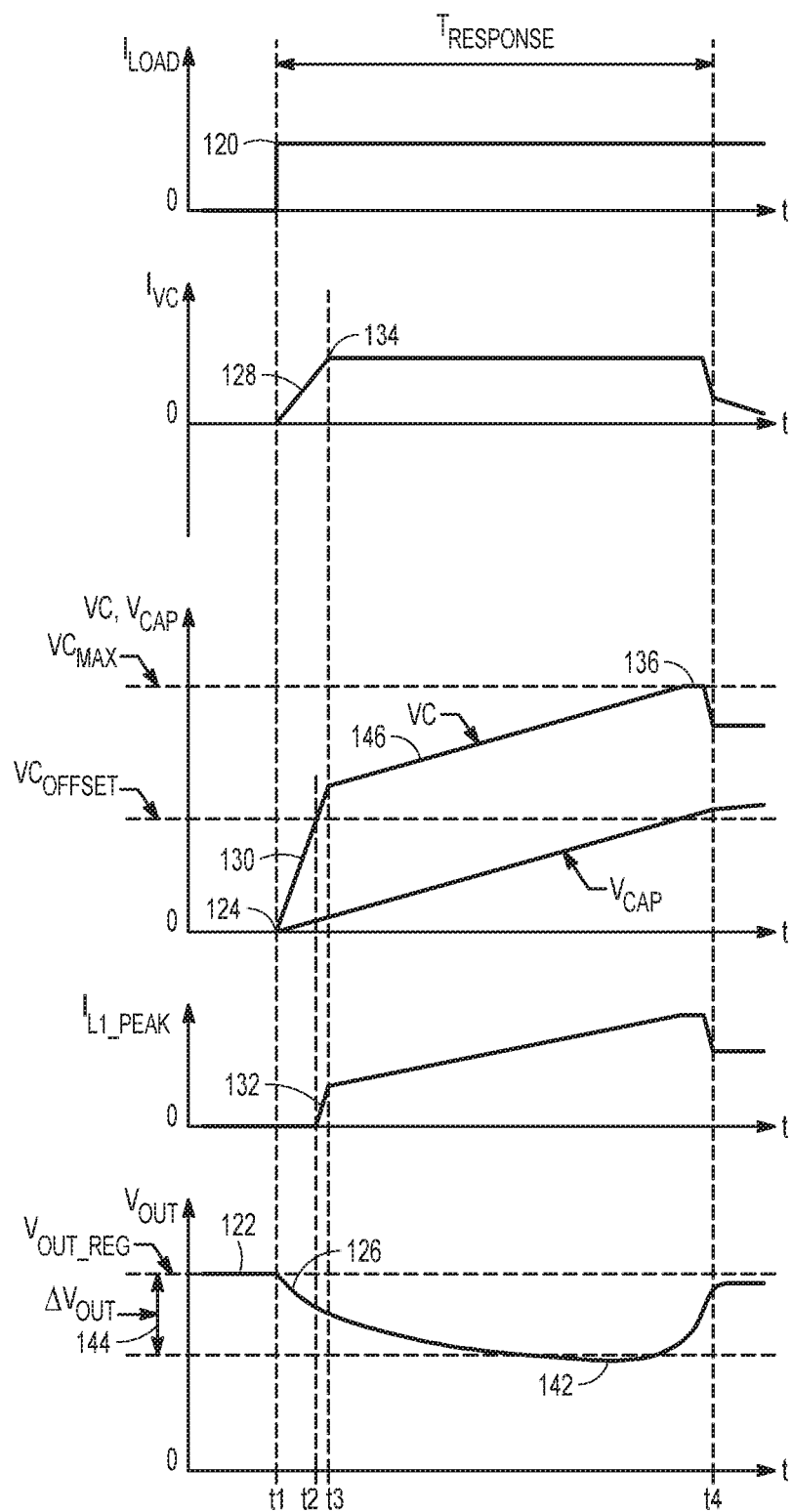
FIG. 3 shows various graphs depicting waveforms of the power supply of FIG. 1.

FIG. 3 shows various graphs depicting waveforms of the power supply of FIG. 1. The waveforms shown in FIG. 3 are responsive to a load current step $I_{LOAD}$ applied at time t1, as shown at 120.

Before time t1, there can be a very small $I_{LOAD}$ current (or no $I_{LOAD}$ current) applied at the output node $V_{OUT}$. In this condition and as shown at 122, the output voltage $V_{OUT}$ can remain at a value slightly higher than the regulated voltage $V_{OUT\_REG}$ for a long time due to a previous operation, such as an output voltage $V_{OUT}$ over-shoot event, and there is almost no current to pull the output voltage $V_{OUT}$ down. Therefore, the feedback voltage $V_{FB}$ applied to the EAMP can be slightly higher than the reference voltage $V_{REF}$ before time t1. As a result, the control voltage VC is pulled to 0V and the voltage $V_{CAP}$ across the capacitor 52 of FIG. 1 is discharged to 0V, as seen at 124.

When the large $I_{LOAD}$ current step is applied on the output node $V_{OUT}$ at time t1, as shown 120, the output voltage $V_{OUT}$ starts to drop, as shown at 126. After the output voltage $V_{OUT}$ drops below $V_{OUT\_REG}$, the control current $I_{VC}$ output by the EAMP 40 of FIG. 1 starts to increase, as shown at 128.

The control voltage VC increases to $VC_{OFFSET}$ at time t2, as shown at 130. The offset voltage $VC_{OFFSET}$ is equal to the VC value where the peak inductor current reaches zero, as shown in FIG. 2. The control current $I_{VC}$ increases to its saturation current at time t3, as shown at 134. The control current $I_{VC}$ flows through the resistor 50 and the capacitor 52 of FIG. 1. The sum of the voltages across the resistor 50 and the capacitor 52 of FIG. 1 generate the control voltage VC. The voltage drop across the resistor 50 is proportional to the control current $I_{VC}$. The voltage drop across the capacitor 52 is an integration of the control current $I_{VC}$, therefore it is gradually charged up.

Between time t1 and time t3, the increase in the control voltage VC is mainly due to the voltage drop across the resistor 50. After time t3, the voltage across the resistor 50 stops increasing due to the control current $I_{VC}$ reaching saturation, and the increase in control voltage VC is solely due to the voltage drop across the capacitor 52.

The control voltage VC stops increasing when it reaches the maximum voltage $VC_{MAX}$, as shown at 136. The inductor current $I_{L1\_PEAK}$ starts to follow the control voltage VC after voltage VC increases higher than the offset voltage $VC_{OFFSET}$ at time t2, as shown at 138. As the inductor current $I_{L1\_PEAK}$ continues to increase, more and more current is delivered to the output node $V_{OUT}$. Eventually, more current is delivered to the output node $V_{OUT}$ than load current $I_{LOAD}$ is demanded by the load and the output voltage $V_{OUT}$ starts to recover, as shown at 142.

The voltage $\Delta V_{OUT}$ is the voltage difference between regulated output voltage $V_{OUT\_REG}$ and the lowest output voltage $V_{OUT}$, as shown at 144. The response time $T_{RESPONSE}$ is the time interval between the load current step $I_{LOAD}$ at time t1 and when the voltage $V_{OUT}$ recovers to be within 10% of $\Delta V_{OUT}$ at time t4. The voltage $\Delta V_{OUT}$ and the time $T_{RESPONSE}$ are important parameters by which the transient response performance of a switching regulator circuit can be evaluated.

As seen at 146, the ramping up of the control voltage VC is greatly slowed down due to the voltage $V_{CAP}$ across the capacitor 50 in FIG. 1 gradually charged from 0V. The DC/DC converter shown in FIG. 1 has a large voltage $\Delta V_{OUT}$ and time $T_{RESPONSE}$ and therefore a poor transient response performance.

Figure 4:
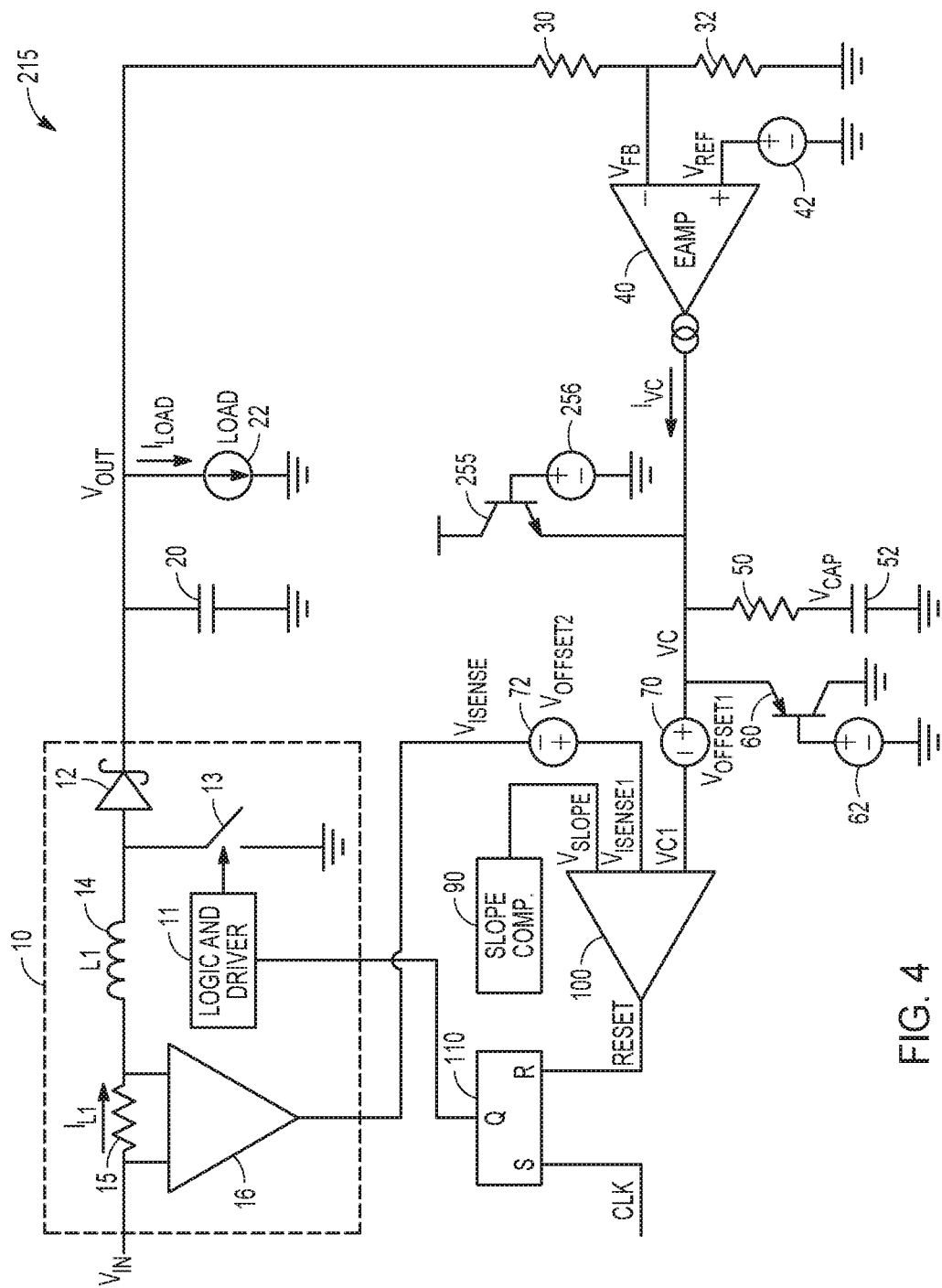
FIG. 4 is a schematic diagram of another example of a DC/DC switching regulator circuit.

FIG. 4 is a schematic diagram of another example of a DC/DC switching regulator circuit. Components in FIG. 4 that are similar to components in FIG. 1 are labeled with similar reference numbers and, for purposes of conciseness, will not be described again.

A transient response of the switching regulator circuit 215 of FIG. 4 can be improved by including a control voltage VC minimum voltage clamp circuit, which can include a transistor 255 and a voltage source 256. The transistor 255 can be a BJT transistor, e.g., NPN, or a FET, e.g., an n-type. As seen in FIG. 4 the control voltage VC minimum voltage clamp circuit can be coupled to the output node of the EAMP 40. More particularly, in the example configuration shown in FIG. 4, an emitter of the BJT transistor 255 can be coupled to the output node of the EAMP 40.

Figure 5:
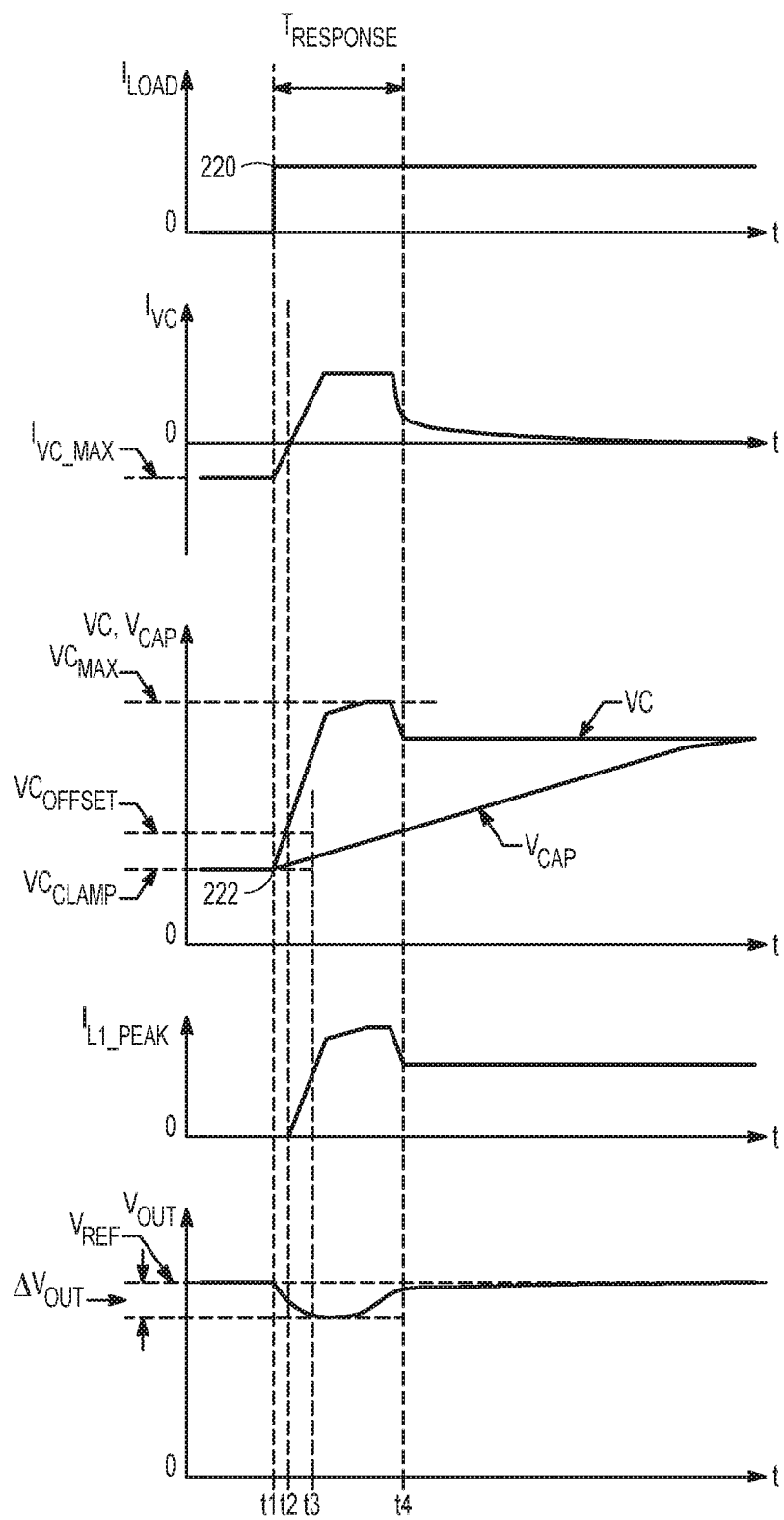
FIG. 5 shows various graphs depicting waveforms of the power supply of FIG. 4.

FIG. 5 shows various graphs depicting waveforms of the power supply of FIG. 4. The waveforms shown in FIG. 5 are responsive to a load current step $I_{LOAD}$ applied at time t1, as shown at 220. As seen at 222, the control VC voltage is clamped to $VC_{CLAMP}$ at time t1. As such, it takes much less time for the control voltage VC to reach the offset voltage $VC_{OFFSET}$ at time t2 as compared to the switching regulator 115 of FIG. 1 where the control voltage VC needs to be raised to $VC_{OFFSET}$ from 0V (shown in FIG. 3). As a result, the voltage $\Delta V_{OUT}$ and the response time $T_{RESPONSE}$ are much smaller than for the switching regulator 115 of FIG. 1 and the transient response performance is improved.

However, the present inventor has recognized that there can be disadvantages to the control voltage VC clamp of FIG. 4. As an example, when the control voltage VC is clamped to the voltage $VC_{CLAMP}$, EAMP 40 attempts to pull control voltage VC down, which can cause a large DC quiescent current $I_{VC\_MAX}$. As another example, the voltage $VC_{CLAMP}$ should to be set to a lower value than the voltage $VC_{OFFSET}$ by a voltage margin (Equation (1) below) to help ensure that the voltage VC1 is low enough to keep the RESET output of the comparator 100 low to keep switch 13 OFF:

$$VC_{CLAMP} < VC_{OFFSET} + V_{MARGIN} \quad \text{Equation (1)}$$

The voltage margin can make the control voltage VC clamp less effective.

As described below with respect to FIG. 6 and FIG. 9, the present inventor has recognized that including a PI controller compensation network clamp can overcome the disadvantages of the switching regulator circuits of FIGS. 1 and 4 to provide a fast system transient response and low quiescent current.

Figure 6:
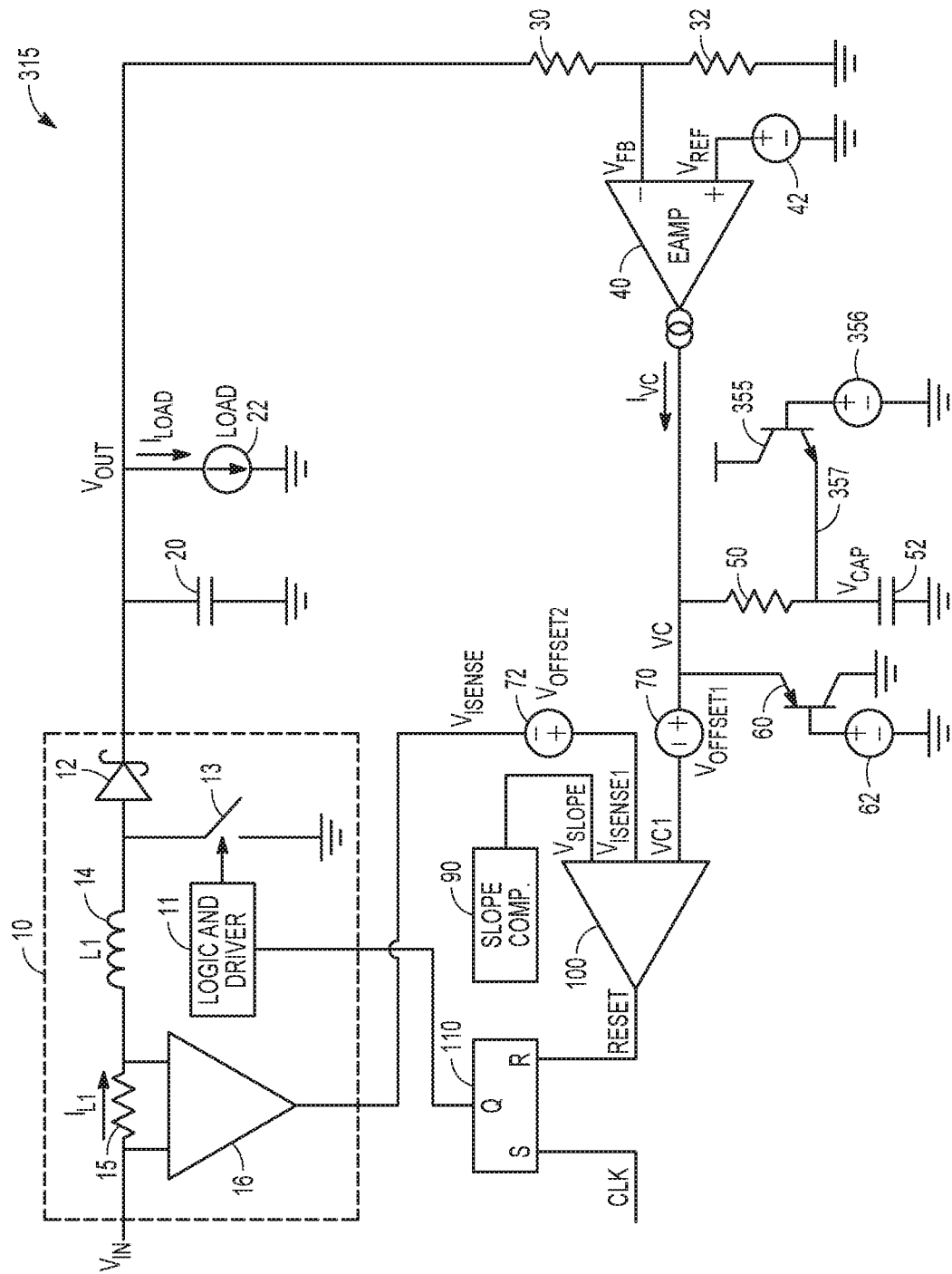
FIG. 6 is a schematic diagram of another example of a DC/DC switching regulator circuit.

FIG. 6 is a schematic diagram of another example of a DC/DC switching regulator circuit. Components in FIG. 6 that are similar to components in FIGS. 1 and 4 are labeled with similar reference numbers and, for purposes of conciseness, will not be described again. The switching regulator circuit 315 of FIG. 6 depicts a boost converter with a PI controller compensation network clamp circuit, e.g., a unidirectional clamp circuit.

The output current $I_{VC}$ of the EAMP 40 corresponds to a difference between the actual output voltage $V_{OUT}$ and the desired output voltage $V_{OUT\_REG}$, which can be set by the voltage reference $V_{REF}$ applied to the EAMP 40. The output current $I_{VC}$ of the EAMP 40 flows through the PI compensation network, which can include at least one resistor 50 for proportional compensation and at least one capacitor 52 for integral compensation to generate a control voltage VC.

One terminal of the capacitor 52 can be coupled a terminal of the resistor 50 at control node 357 $V_{CAP}$. The other terminal of the capacitor 52 can be connected to ground, for example. The other terminal of the resistor 50 can be connected to the control voltage node VC 360.

The PI compensation network clamp circuit can include a transistor 355 and a reference voltage source 356. The transistor 355 can be a BJT, e.g., an NPN, or a FET, e.g., an n-type. In the example configuration shown in FIG. 6, an emitter terminal of the BJT transistor 355 can be coupled to the control node 357 $V_{CAP}$. In configurations that use an n-type FET (not depicted), a source terminal of the FET 20 can be coupled to the control node 357 $V_{CAP}$. The unidirectional clamp voltage $V_{CLAMP}$ is the voltage of the reference voltage source 356 minus the base-to-emitter voltage drop of the transistor 355 when it is on. The clamp voltage $V_{CLAMP}$ is also referred to in this disclosure as a reference voltage.

The PI compensation network clamp circuit permits a voltage at the control node 357 $V_{CAP}$ to move when the voltage at the control node is higher than the voltage $V_{CLAMP}$ but can clamp the capacitor 52 to the voltage $V_{CLAMP}$ when the voltage at the control node attempts to move to a voltage that is lower than the voltage $V_{CLAMP}$.

Because only the voltage across the capacitor 52 is clamped to the clamp voltage $V_{CLAMP}$, the current $I_{VC}$ flowing through the resistor 50 can generate a voltage drop to lower the control voltage VC below the voltage $V_{CLAMP}$. Therefore, the voltage $V_{CLAMP}$ can be set to be equal to the offset voltage $VC_{OFFSET}$ and without the limitation of Equation (1), thereby making the clamp more effective.

Another benefit of using the PI compensation network clamp approach of FIG. 6 is that when the resistance R of the resistor 50 is sufficiently large, such as based on Equation (2) below, then the resistor 50 can push the EAMP 40 to saturation, resulting in a DC standby or quiescent current lower than the maximum control voltage current $I_{VC\_MAX}$:

$$R > V_{CLAMP}/I_{VC\_MAX} \quad \text{Equation (2)}$$

In this manner, the resistance of the at least one resistor can be configured to limit the DC quiescent current of the error amplifier when the control signal is pulled to ground, for example.

Figure 7:
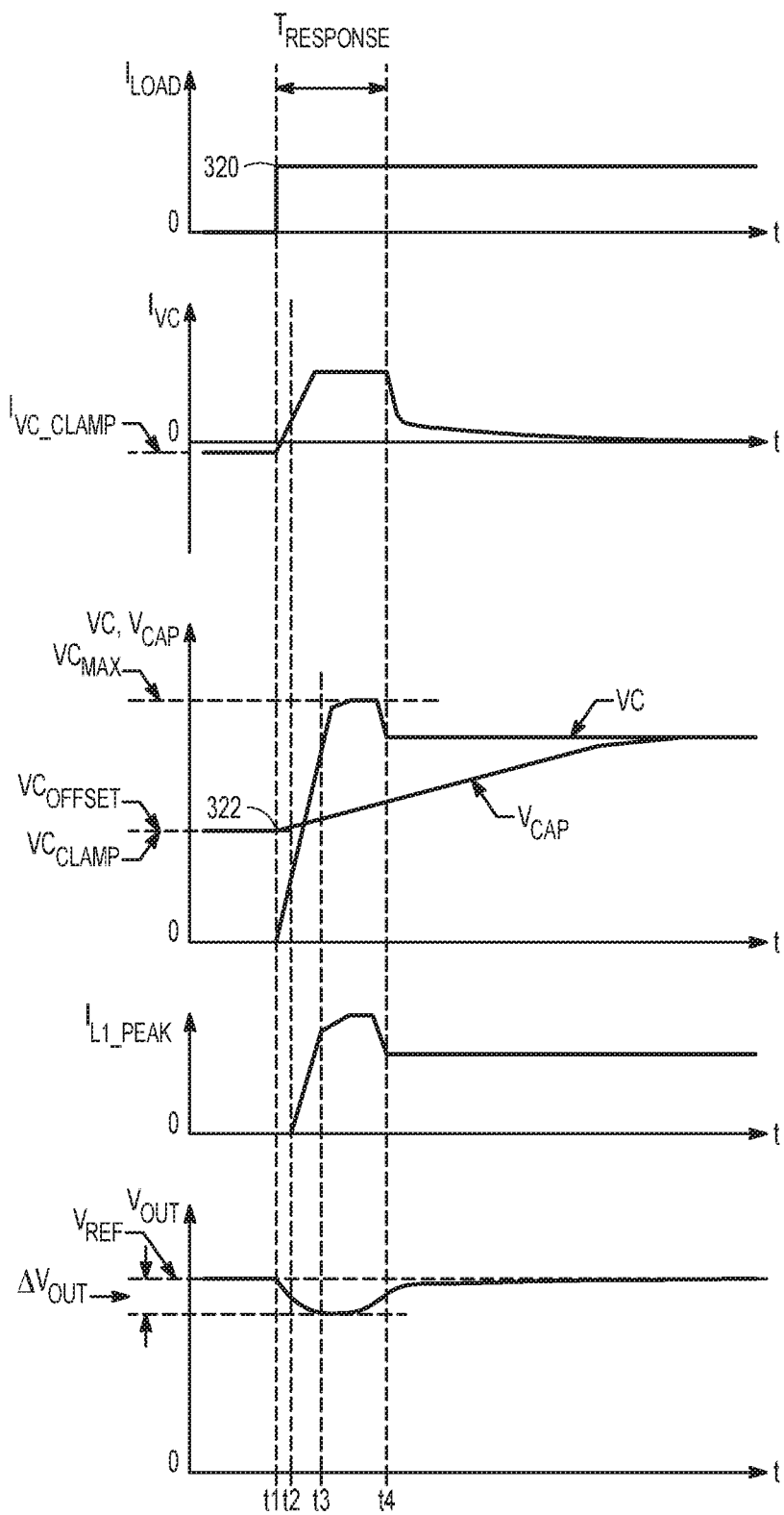
FIG. 7 shows various graphs depicting waveforms using a first implementation of the switching regulator circuit of FIG. 6.

FIG. 7 shows various graphs depicting waveforms using a first implementation of the switching regulator circuit of FIG. 6, where the clamp voltage $V_{CLAMP}$ is set to be equal to the offset voltage $VC_{OFFSET}$. The waveforms shown in FIG. 7 are responsive to a load current step $I_{LOAD}$ applied at time t1, as shown at 320. Since the control voltage VC is clamped to the voltage $VC_{OFFSET}$ at time t1, as shown at 322, it takes less time for the control voltage VC to reach the offset voltage $VC_{OFFSET}$ at time t2 as compared to the switching regulator circuit 215 of FIG. 4. As a result, the voltage $\Delta V_{OUT}$ and response time $T_{RESPONSE}$ are much smaller than for the switching regulator 215 of FIG. 4 and the transient response performance is improved. In addition, the DC standby or quiescent current is lower than for the switching regulator 215 of FIG. 4, thereby reducing power consumption.

In the first implementation, the PI control compensation network clamp voltage $V_{CLAMP}$ can be set to be equal to the control voltage VC value where the peak inductor current $I_{L1\_PEAK}$ reaches zero, the voltage $VC_{OFFSET}$. Fast transient response can be achieved, and the DC standby or quiescent current can be reduced by the compensation resistor 50.

Figure 8:
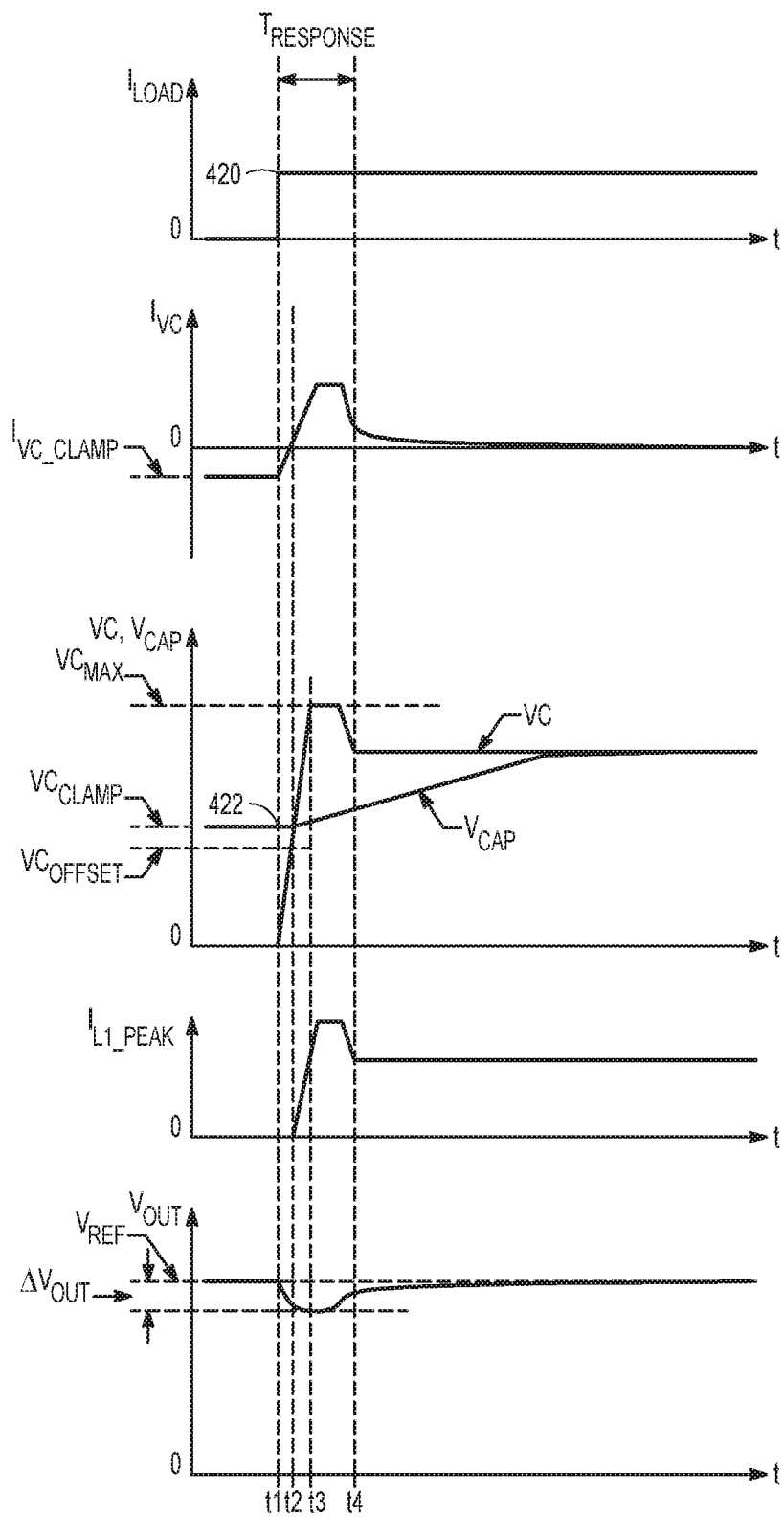
FIG. 8 shows various graphs depicting waveforms using a second implementation of the switching regulator circuit of FIG. 6.

FIG. 8 shows various graphs depicting waveforms using a second implementation of the switching regulator circuit of FIG. 6. The waveforms shown in FIG. 8 are responsive to a load current step $I_{LOAD}$ applied at time t1, as shown at 420. In the second implementation of the switching regulator circuit 315 of FIG. 6, the voltage $V_{CLAMP}$ can be set higher than the offset voltage $VC_{OFFSET}$, as shown at 422. The highest value the voltage $V_{CLAMP}$ can be set can be determined according to Equation (3) using the resistance R of the resistor 50, the maximum control voltage current $I_{VC\_MAX}$, and the offset voltage $VC_{OFFSET}$:

$$V_{CLAMP} < VC_{OFFSET} + (I_{VC\_MAX} \cdot R) \quad \text{Equation (3)}$$

Based on Equation (3), the reference voltage can be configured to be set lower than a voltage at which the voltage VC can still be pulled low enough to keep the inductor current to be zero amps by the error amplifier in light load or zero load conditions.

The power supply circuit of FIG. 6 operates in proportional control when the current control signal voltage is lower than the clamp voltage $V_{CLAMP}$, as shown in Equation (4):

$$VC < V_{CLAMP} \quad \text{Equation (4)}$$

Proportional control can provide a fast transient response with higher control error. The $V_{OUT}$ DC offset in proportional control can be estimated by Equation (5):

$$V_{OUT\_OFFSET} = (VC - V_{CLAMP})/(R \cdot gm) \cdot (R1 + R2)/R2 \quad \text{Equation (5)}$$

where gm is the transconductance of the transistor 355, R1 is the resistance of resistor 30, and R2 is the resistance of resistor 32 of FIG. 6.

The switching regulator circuit of FIG. 6 operates in proportional-integral control when the current control signal voltage VC is higher than the clamp voltage $V_{CLAMP}$, as shown in Equation (6):

$$VC > V_{CLAMP} \quad \text{Equation (6)}$$

In the second implementation, because the control voltage VC is clamped to a voltage $VC_{CLAMP}$ that is even higher than the offset $VC_{OFFSET}$ at time t1, it takes less time for the control voltage VC to reach the offset voltage $VC_{OFFSET}$ at time t2 as compared to the first implementation shown in FIG. 7. As a result, the voltage $\Delta V_{OUT}$ and the response time $T_{RESPONSE}$ of the second implementation are smaller than that in the first implementation in which the control voltage VC is clamped to the voltage $VC_{OFFSET}$ at time t1. In addition, desirable transient response performance is achieved. Based on Equations (3) to (6) and FIG. 8, the second implementation can provide a technique to allow a tradeoff between the transient response speed and the output voltage standby accuracy.

In the second implementation, the switching regulator circuit 315 of FIG. 6 operates in proportional control when the control voltage VC is lower than the clamp voltage, which results in an output voltage DC offset. The switching regulator circuit 315 of FIG. 6 operates in proportional-integral control when the control voltage VC is higher than the clamp voltage, which has no output voltage DC offset. Because the voltage $V_{CLAMP}$ is high, it takes less time to charge up the compensation capacitor 52, thereby achieving fast transient response.

Figure 9:
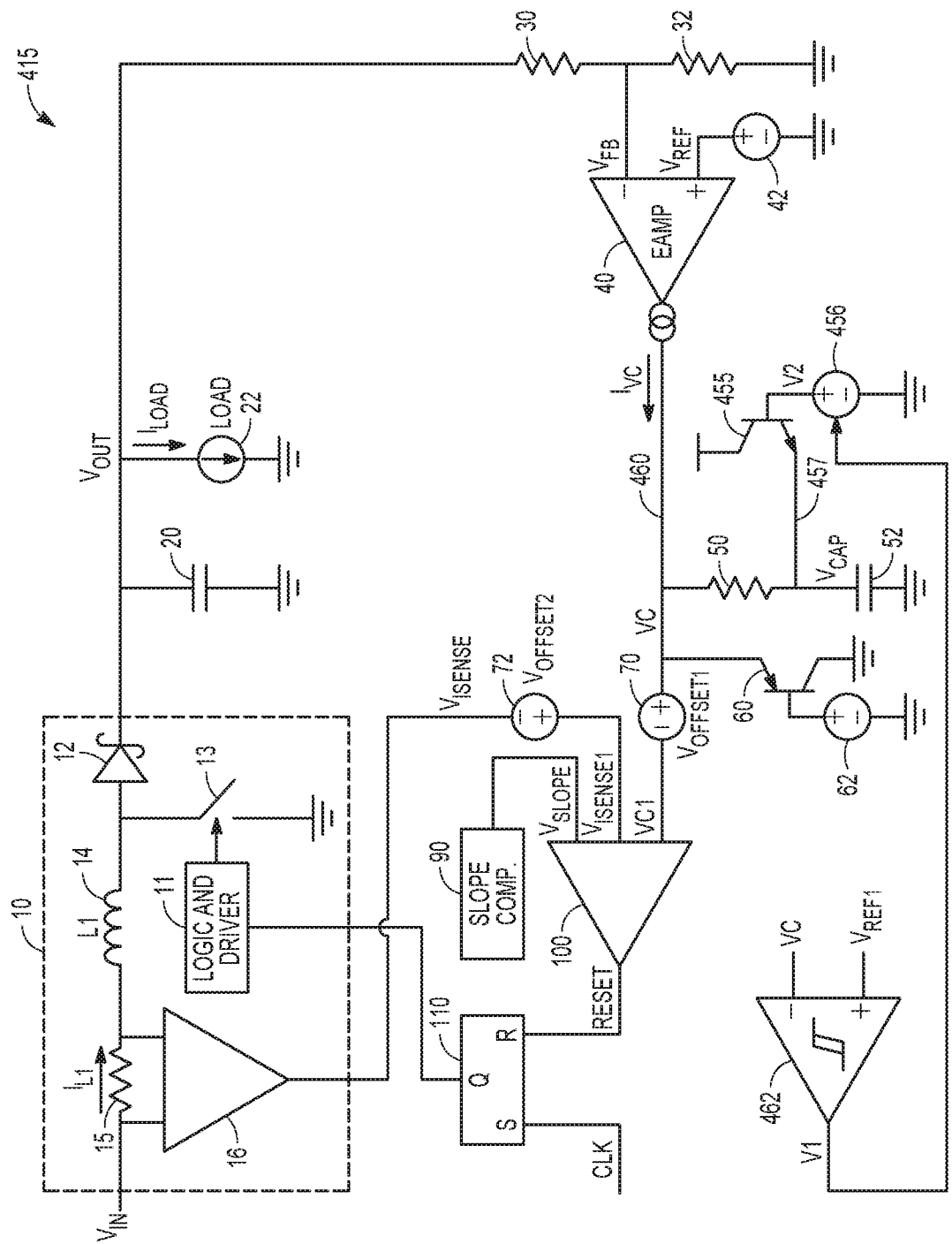
FIG. 9 is a schematic diagram of another example of a DC/DC switching regulator circuit.

FIG. 9 is a schematic diagram of another example of a DC/DC switching regulator circuit. Some of the components in FIG. 9 that are similar to components in FIGS. 1, 4, and 6 are labeled with similar reference numbers and, for purposes of conciseness, will not be described again. The switching regulator circuit 415 of FIG. 9 depicts a boost converter with an adaptive PI controller compensation network clamp circuit, e.g., an adaptive unidirectional clamp circuit.

The output current $I_{VC}$ of the EAMP 40 corresponds to a difference between the actual output voltage $V_{OUT}$ and the desired output voltage $V_{OUT\_REG}$, which can be set by the voltage reference $V_{REF}$ applied to the EAMP 40. The output current $I_{VC}$ of the EAMP 40 flows through the PI compensation network, which can include at least one resistor 50 for proportional compensation and at least one capacitor 52 for integral compensation to generate a control voltage VC.

One terminal of the capacitor 52 can be coupled to a terminal of the resistor 50 at control node 457. The other terminal of the capacitor 52 can be connected to ground, for example. The other terminal of the resistor 50 can be connected to the control voltage node VC 460.

The PI compensation network clamp circuit can include a clamp transistor 455 and a reference voltage source 456. The transistor 455 can be a BJT, e.g., an NPN, or a FET, e.g., an n-type. In the example configuration shown in FIG. 9, an emitter terminal of the BJT transistor 455 can be coupled to the control node 457. In configurations that use an n-type FET (not depicted), a source terminal of the FET can be coupled to the control node 457. The unidirectional clamp voltage $V_{CLAMP}$ is the voltage V2 of the reference voltage source 456 minus the base-to-emitter voltage drop of the transistor 455 when it is on.

Figure 10:
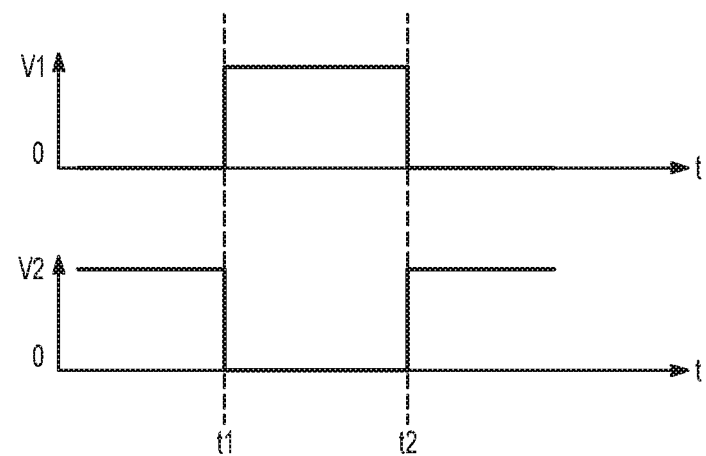
FIG. 10 is a graph depicting a relationship between an output of a comparator and a voltage source of the power supply of FIG. 9.

Compared to the circuit 315 in FIG. 6, the circuit 415 shown in FIG. 9 includes a comparator circuit 462 to establish an adaptive PI compensation network clamp. The comparator 462 has input voltage hysteresis. The comparator 462 compares the control voltage VC (also referred to as the current control signal) with another reference voltage $V_{REF1}$, e.g., a threshold voltage, and generates logic signal V1. The logic signal V1 is a clamp control signal that can adjust the clamp circuit that includes the transistor 455 and the voltage source 456. More particularly, the logic signal V1 is applied to the voltage source 456 to change its output voltage V2, as shown in FIG. 10. The comparator 462 can generate the clamp control signal to disable the clamp circuit if the clamp control signal is at a first logic level, and to enable the clamp circuit if the clamp control signal is at a second logic level The reference voltage $V_{REF1}$, the threshold voltage, can be selected to be a value that is equal to or lower than the control voltage VC value where the peak inductor current reaches zero amps (voltage $VC_{OFFSET}$). At time t1, the voltage VC is lower than the voltage $V_{REF1}$ and the comparator 462 flips the signal V1 from a logic low to a logic high, which indicates that the current $I_{LOAD}$ is zero. The voltage V2 is pulled to 0V, which essentially disables the PI compensation network clamp. After time t1, the voltage of control node 457 $V_{CAP}$ is allowed to move lower than the $V_{CLAMP}$. As a result, the EAMP 40 DC standby or quiescent current is further reduced. At time t2, the current $I_{LOAD}$ increases from zero, causing the output voltage $V_{OUT}$ to decrease. The control voltage VC increases in response. When the control VC is higher than the voltage $V_{REF1}$, the comparator 462 flips the voltage V1 from a logic high to a logic low. The voltage V2 is restored and the PI compensation network clamp is activated again. The voltage of control node 457 $V_{CAP}$ is pulled to $V_{CLAMP}$ immediately, achieving a fast transient response.

FIG. 10 is a graph depicting a relationship between an output of a comparator and a voltage source of the power supply of FIG. 9. More particularly, FIG. 10 depicts the relationship between the output signal V1 of the comparator 462 in FIG. 9 to the voltage V2 of the voltage source 456 in FIG. 9.

Figure 11:
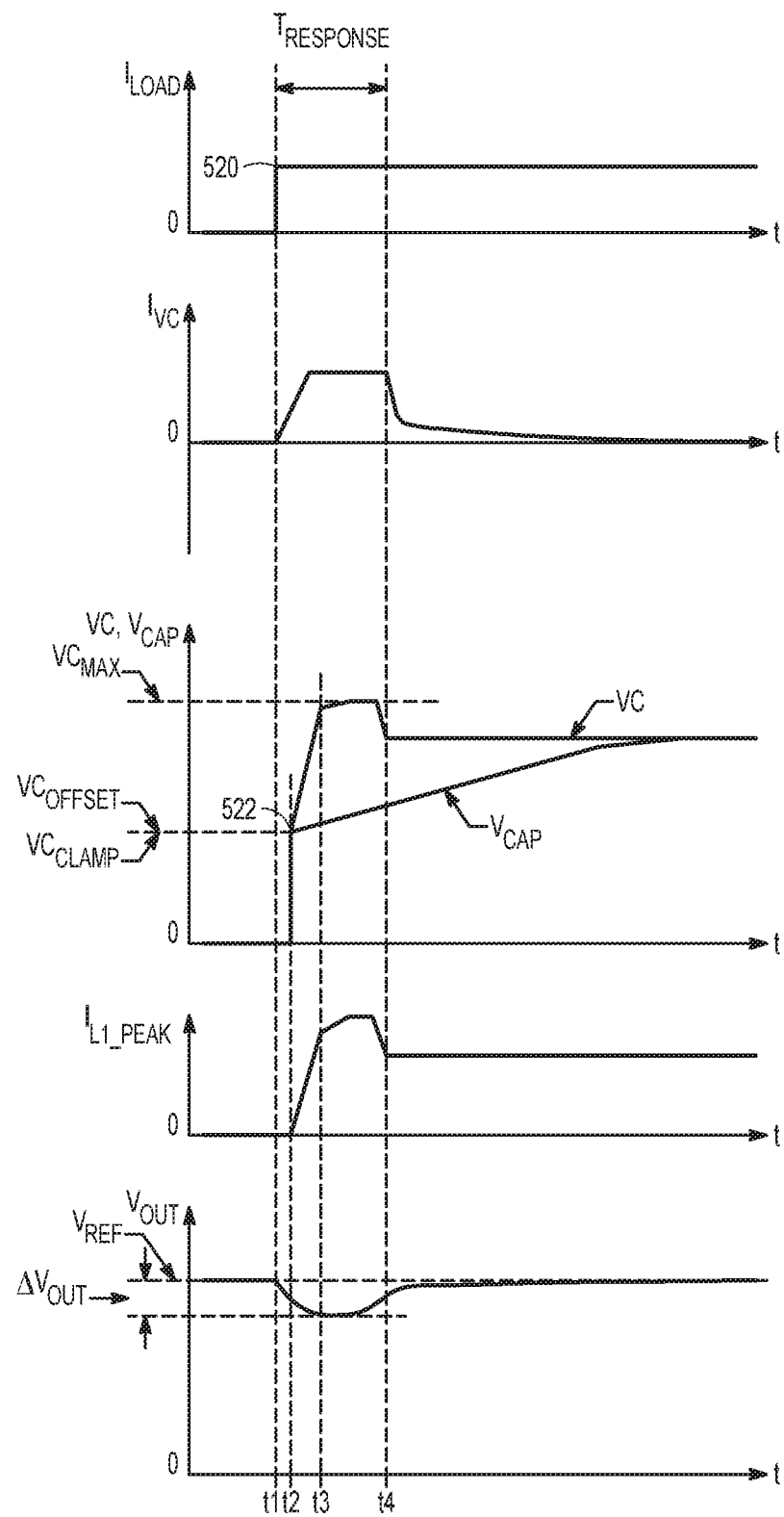
FIG. 11 shows various graphs depicting waveforms using a first implementation of the switching regulator circuit of FIG. 9.

FIG. 11 shows various graphs depicting waveforms using a first implementation of the switching regulator circuit of FIG. 9, where $V_{CLAMP}$ is set to be equal to the offset voltage $VC_{OFFSET}$. The waveforms shown in FIG. 11 are responsive to a load current step $I_{LOAD}$ applied at time t1, as shown at 520. The PI control compensation network clamp is disabled before time t1, which can allow the control node voltage 457 $V_{CAP}$ to be pulled to 0V, resulting a very small current $I_{VC}$. The EAMP DC standby or quiescent current is minimized before time t1. The control voltage VC starts to increase at time t1. When the control voltage VC rises above the reference voltage $V_{REF1}$, the PI control compensation network clamp is activated and the voltage of control node 457 $V_{CAP}$ is pulled to the clamp voltage $V_{CLAMP}$ immediately, achieving a fast transient response.

Figure 12:
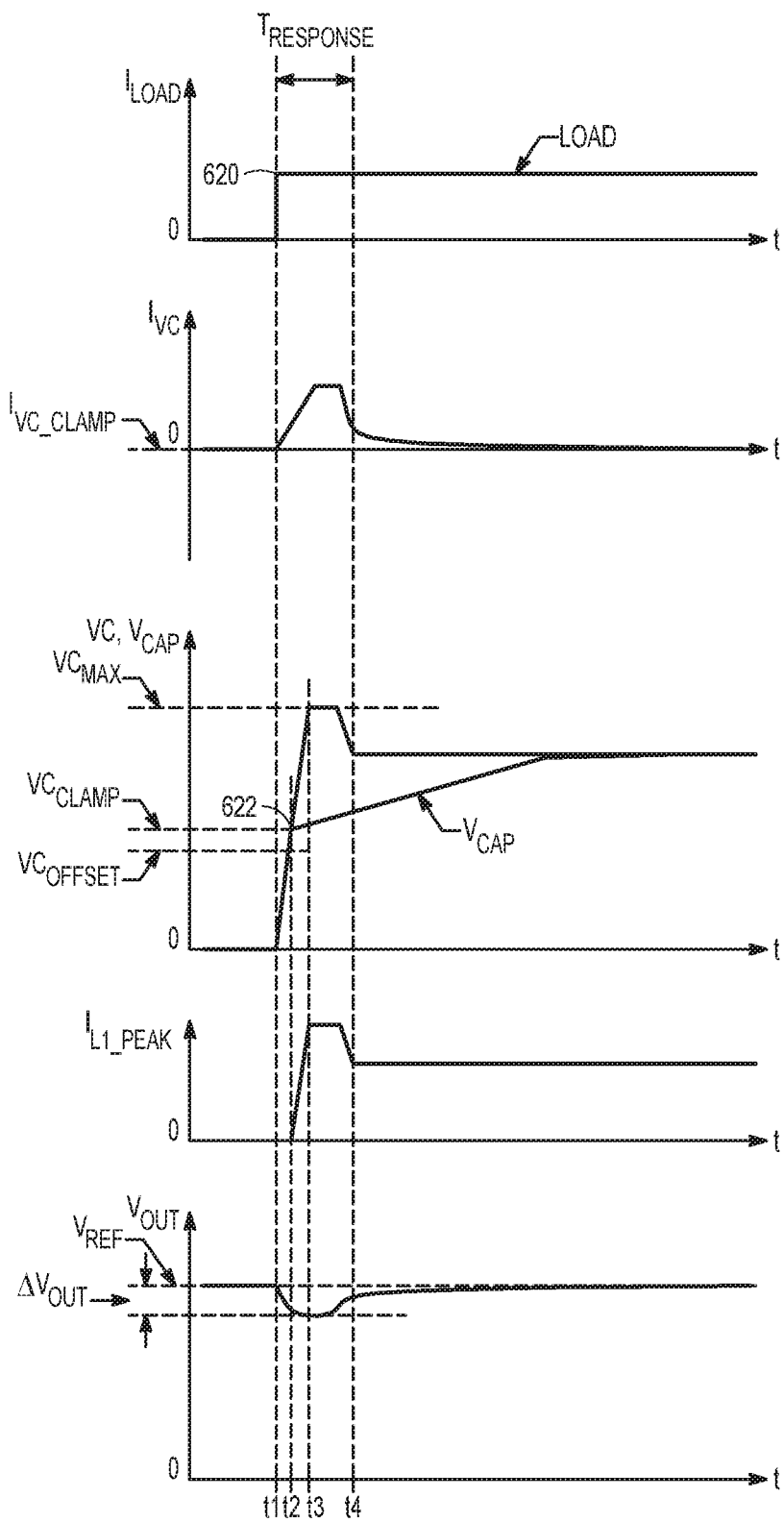
FIG. 12 shows various graphs depicting waveforms using a second implementation of the switching regulator circuit of FIG. 9.

FIG. 12 shows various graphs depicting waveforms using a second implementation of the switching regulator circuit of FIG. 9. The waveforms shown in FIG. 12 are responsive to a load current step $I_{LOAD}$ applied at time t1, as shown at 620. In the second implementation of the switching regulator circuit 415 of FIG. 9, the clamp voltage $V_{CLAMP}$ can be set higher than the offset voltage $VC_{OFFSET}$, as shown at 622. The PI control compensation network clamp is disabled before time t1, which can allow the control node voltage 457 $V_{CAP}$ to be pulled to 0V, resulting in a very small current $I_{VC}$. The EAMP DC standby or quiescent current is minimized before time t1. The control voltage VC starts to increase at time t1. When the control voltage VC rises above $V_{REF1}$, the PI control compensation network clamp is activated and the voltage of control node 457 $V_{CAP}$ is pulled to the clamp voltage $V_{CLAMP}$ immediately, achieving a fast transient response. After the PI control compensation network clamp is activated the operation of the second implementation of 415 of FIG. 9 is essentially the same as the second implementation of 315 of FIG. 6, therefore equation (3) to (6) can be applied. The second implementation of circuit 415 achieves an even faster transient response than that of the first implementation. The second implementation can provide a technique to allow a tradeoff between the transient response speed and the output voltage standby accuracy.

NOTES

Each of the non-limiting aspects or examples described herein may stand on its own or may be combined in various permutations or combinations with one or more of the other examples.

The above detailed description includes references to the accompanying drawings, which form a part of the detailed description. The drawings show, by way of illustration, specific embodiments in which the invention may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact discs and digital video discs), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments may be combined with each other in various combinations or permutations. The scope of the invention should be determined with reference to the appended claims, along with the full scope of equivalents to which such claims are entitled.

The claimed invention is:

1. A switching regulator circuit to supply a current at a regulated voltage to an output node coupled to a load, the switching regulator circuit comprising:
   a power stage circuit configured to supply the current to the output node, the power stage circuit including an inductor and a switch circuit and coupled between an input node and the output node;
   an error amplifier circuit configured to receive a representation of an output node voltage and generate a current control signal to maintain the output node at the regulated voltage by controlling an inductor current;
   a compensation network coupled to an output node of the error amplifier circuit, the compensation network including at least one resistor and at least one capacitor, the at least one resistor electrically coupled to the output node of the error amplifier circuit and a control node, the at least one capacitor electrically coupled between the control node and ground;
   a unidirectional clamp circuit coupled to the control node, the unidirectional clamp circuit configured to permit a voltage at the control node to move when the voltage at the control node is higher than a reference voltage and otherwise inhibit the voltage at the control node from moving below the reference voltage; and
   a control circuit configured to receive the current control signal and control the inductor current using the current control signal.

2. The switching regulator circuit of claim 1, wherein the clamp circuit is activated when the error amplifier circuit attempts to move the voltage at the control node lower than the reference voltage.

3. The switching regulator circuit of claim 1, wherein the reference voltage is configured to be set equal to a voltage of the current control signal that sets a peak inductor current to zero amps.

4. The switching regulator circuit of claim 3, wherein the resistance of the at least one resistor is configured to limit a DC quiescent current of the error amplifier when the control signal is pulled to ground.

5. The switching regulator circuit of claim 1, wherein the reference voltage is configured to be set equal to a voltage of the current control signal that sets a peak inductor current to be greater than zero amps.

6. The switching regulator circuit of claim 5, wherein the compensation network is set to proportional (P) control only and integral (I) control disabled when the current control signal voltage is lower than the reference voltage.

7. The switching regulator circuit of claim 5, wherein the compensation network is set to Proportional-Integral (PI) control when the current control signal voltage is higher than the reference voltage.

8. The switching regulator circuit of claim 5, wherein the reference voltage is configured to be set lower than a voltage at which the current control signal can still be pulled low enough to maintain the inductor current at zero amps by the error amplifier, through a voltage drop across the resistor in the compensation network, at light load or zero load.

9. The switching regulator circuit of claim 1, further comprising:
a comparator with input hysteresis, the comparator configured to compare the current control signal to a threshold voltage and generate a clamp control signal to adjust the clamp circuit.

10. The switching regulator circuit of claim 9, wherein the threshold voltage is configured to be set equal to a voltage of the current control signal that sets a peak inductor current to zero amps.

11. The switching regulator circuit of claim 9, wherein the threshold voltage is configured to be set lower than a voltage of the current control signal that sets a peak inductor current to zero amps.

12. The switching regulator circuit of claim 9, wherein the comparator is configured to generate the clamp control signal to disable the clamp circuit if the clamp control signal is at a first logic level, and to enable the clamp circuit if the clamp control signal is at a second logic level.

13. A method of operating a switching regulator circuit to supply a current at a regulated voltage to an output node coupled to a load, the method comprising:
supplying the current to the output node, the power stage circuit including an inductor and a switch circuit and coupled between an input node and the output node;
receiving a representation of an output node voltage and generating a current control signal to maintain the output node at the regulated voltage by controlling an inductor current;
clamping, a control node in a compensation network to a reference voltage, the compensation network including at least one resistor and at least one capacitor, the at least one resistor electrically coupled to the output node of the error amplifier circuit and the control node, the at least one capacitor electrically coupled between the control node and ground, wherein clamping the control node includes permitting a voltage at the control node to move when the voltage at the control node is higher than a reference voltage and clamping the voltage at the control node to the reference voltage in response to the error amplifier circuit attempting to move the voltage at the control node lower than the reference voltage; and
controlling the inductor current using the current control signal.

14. The method of claim 13, further comprising:
deactivating a clamp circuit when the voltage at the control node is higher than the reference voltage; and
activating the clamp circuit when the error amplifier circuit attempts to move the control node to a voltage that is lower than the reference voltage.

15. The method of claim 13, further comprising:
setting the reference voltage equal to a voltage of the current control signal that sets a peak inductor current to zero amps.

16. The method of claim 13, further comprising:
setting the reference voltage equal to a voltage of the current control signal that sets a peak inductor current to be greater than zero amps.

17. The method of claim 16, further comprising:
setting the compensation network to proportional (P) control only and integral (I) control disabled when the current control signal voltage is lower than the reference voltage.

18. The method of claim 16, further comprising:
setting the compensation network to Proportional-Integral (PI) control when the current control signal voltage is higher than the reference voltage.

19. A switching regulator circuit to supply a current at a regulated voltage to an output node coupled to a load, the switching regulator circuit comprising:
a power stage circuit configured to supply the current to the output node, the power stage circuit including an inductor and a switch circuit and coupled between an input node and the output node;
an error amplifier circuit configured to receive a representation of an output node voltage and generate a current control signal to maintain the output node at the regulated voltage by controlling an inductor current;
means for clamping a control node in a compensation network to a reference voltage, the compensation network including at least one resistor and at least one capacitor, the at least one resistor electrically coupled to the output node of the error amplifier circuit and the control node, the at least one capacitor electrically coupled to the control node and ground, wherein the means for unidirectionally clamping the control node is configured to permit a voltage at the control node to move when the voltage at the control node is higher than a reference voltage and clamp the voltage at the control node to the reference voltage in response to the error amplifier circuit attempting to move the voltage at the control node lower than the reference voltage; and
means for controlling the inductor current using the current control signal.

20. The switching regulator circuit of claim 19, wherein the means for clamping the control node in the compensation network to the reference voltage includes:
means for permitting a voltage at the control node to move when the voltage at the control node is higher than the reference voltage; and
means for clamping the voltage at the control node to the reference voltage when the voltage at the control node attempts to move to a voltage that is lower than the reference voltage.

* * * * *